United States Patent [19]
Reagan

[11] Patent Number: 5,430,578
[45] Date of Patent: Jul. 4, 1995

[54] TRUE IMAGE MIRROR

[76] Inventor: Stuart A. Reagan, 13 Breckinridge Blvd., Frankfort, Ky. 40601

[21] Appl. No.: 199,742

[22] Filed: Feb. 22, 1994

[51] Int. Cl.⁶ .......................... G02B 5/08; G02B 7/182
[52] U.S. Cl. .................................... 359/855; 359/856; 359/865
[58] Field of Search ............... 359/850, 855, 856, 857, 359/865, 872, 883

[56] References Cited

U.S. PATENT DOCUMENTS

| | | | |
|---|---|---|---|
| 273,445 | 3/1883 | Blake | 359/855 |
| 370,623 | 9/1887 | Hooker | 359/856 |
| 505,127 | 9/1893 | Ranger | 359/855 |
| 1,855,095 | 4/1932 | Campbell | 359/855 |
| 2,036,184 | 4/1936 | Armstrong | 359/855 |
| 2,059,823 | 11/1936 | Sunderhauf | 359/855 |
| 2,389,788 | 11/1945 | Lathrop | 359/855 |
| 4,268,121 | 5/1981 | Peskin | 359/856 |

FOREIGN PATENT DOCUMENTS

| | | | |
|---|---|---|---|
| 749669 | 1/1967 | Canada | 359/883 |
| 0056968 | 8/1982 | European Pat. Off. | 359/856 |
| 2433599 | 1/1976 | Germany | 359/883 |
| 3921103 | 11/1990 | Germany | 359/855 |

*Primary Examiner*—Ricky D. Shafer
*Attorney, Agent, or Firm*—Michael Kroll

[57] ABSTRACT

A true image mirror is provided which consists of a first structure for reflecting a virtual image of an object placed in front of it. A second structure is for reflecting a virtual image of the object placed in front of it. A component is for positioning the first reflecting structure at a right angle arrangement with the second reflecting structure. A true image will be reflected back in which items on a right side will be seen on a right side and items Ion a left side will be seen on a left side, instead of being reversed as in a typical standard mirror.

6 Claims, 2 Drawing Sheets

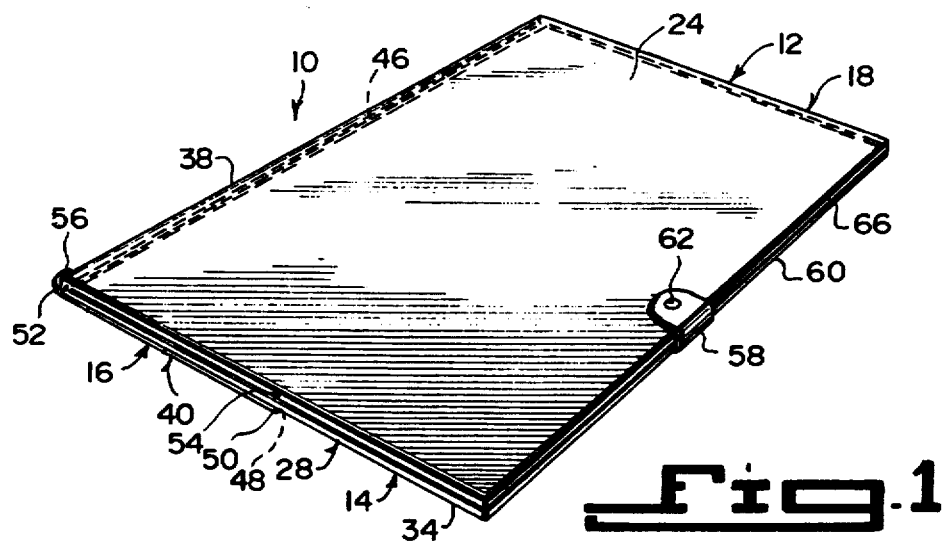
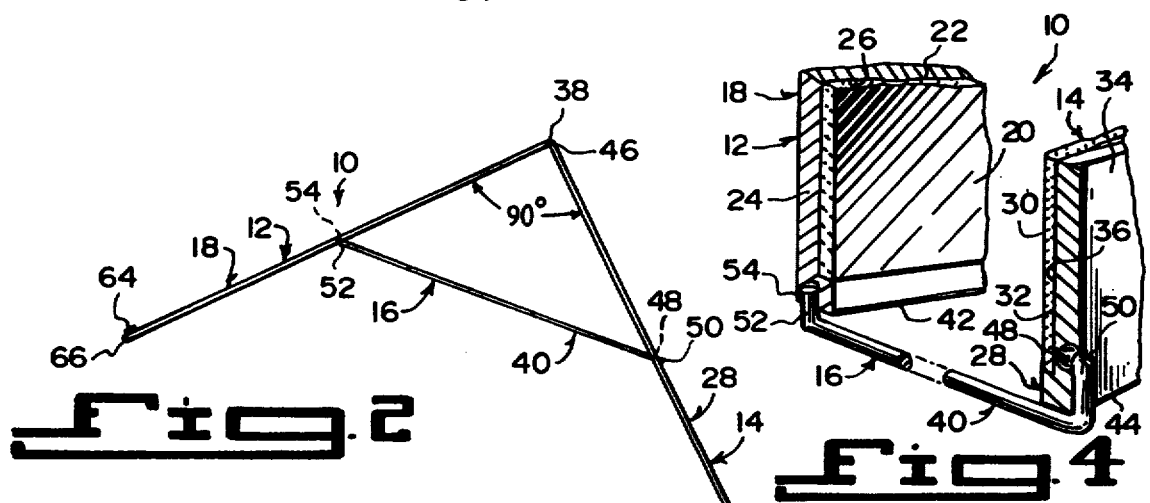
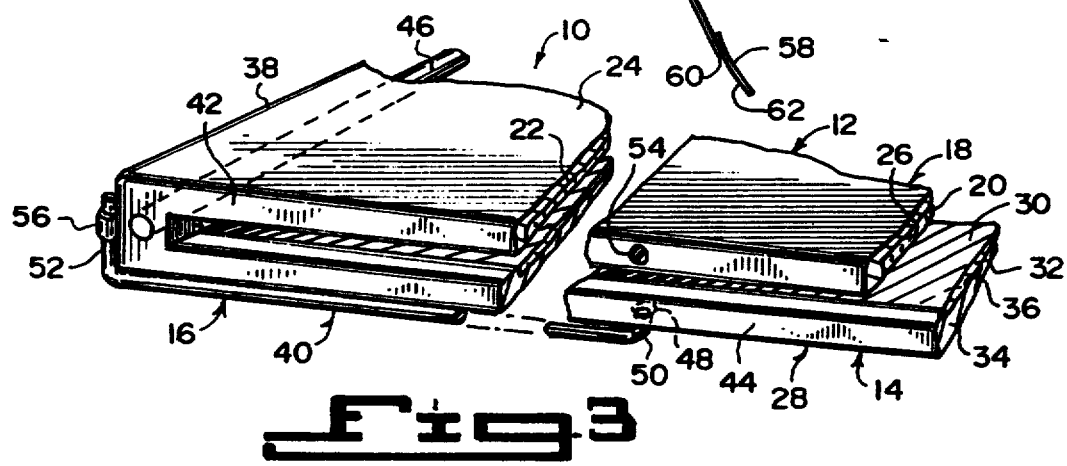

TRUE IMAGE MIRROR

BACKGROUND OF THE INVENTION

1. Field of the Invention

The instant invention relates generally to mirrors and more specifically it relates to a true image mirror.

2. Description of the Prior Art

Reflection of light is such that clear-cut reproductions of objects are formed when light rays from an object fall on certain surfaces. Such a surface is called a mirror and the image of the object is a reproduction. Mirrors usually are plate glass with one surface coated to serve as a reflecting surface. A junction of the reflecting surface and the glass is a mirror line. A plain mirror is one with a flat surface. The image is almost exactly like the object, whereby an illusion of perspective is created. The image appears to be behind the mirror, but is at the mirror line. The image is virtual and the same size as the object. The image also appears to be the same distance behind the mirror as the objects is in front of it. Exactness of the image depends on the quality and condition of the mirror.

In a concave mirror, the center of the reflecting surface is farther from the object than are the edges. The center of the imaginary sphere of which it is part is the center of curvature. A line through the center of curvature and mid-point of the mirror is the principal axis. The principal focus is the point halfway between the center of curvature and the vertex. Size, nature, and position of the image depends on the position of the object in relation to the principal focus and the center of curvature.

In a convex mirror the image is always smaller than the object, erect, and virtual. Mirrors are used in interior decoration, in microscopes to reflect light and in astronomical telescopes.

Numerous mirrors have been provided in prior art that are smooth substances, such as glass, that reflect images. While these units may be suitable for the particular purpose to which they address, they would not be as suitable for the purposes of the present invention as heretofore described.

SUMMARY OF THE INVENTION

A primary object of the present invention is to provide a true image mirror that will overcome the shortcomings of the prior art devices.

Another object is to provide a true image mirror that will reflect a true image rather than a mirror image in which objects on a right side will be reflected back on a right side, while objects on a left side will be reflected back on a left side instead of being reversed.

An additional object is to provide a true image mirror in which the true image is created by utilizing two reflecting surfaces in a right angle placement to each other, to allow a person to examine their appearance as other people see them.

A further object is to provide a true image mirror that is simple and easy to use.

A still further object is to provide a true image mirror that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a bottom perspective view of the instant invention in a closed position.

FIG. 2 is a top view of the instant invention in an opened position.

FIG. 3 is an enlarged bottom perspective view of a portion of the instant invention in the closed position, showing the telescopic support rod structure in greater detail.

FIG. 4 is an enlarged front perspective view of a portion of the instant invention in the opened position, showing the telescopic support rod structure in greater detail.

DETAILED DESCRIPTION OF THE PREFERRED EMBODIMENTS

Figure 5:
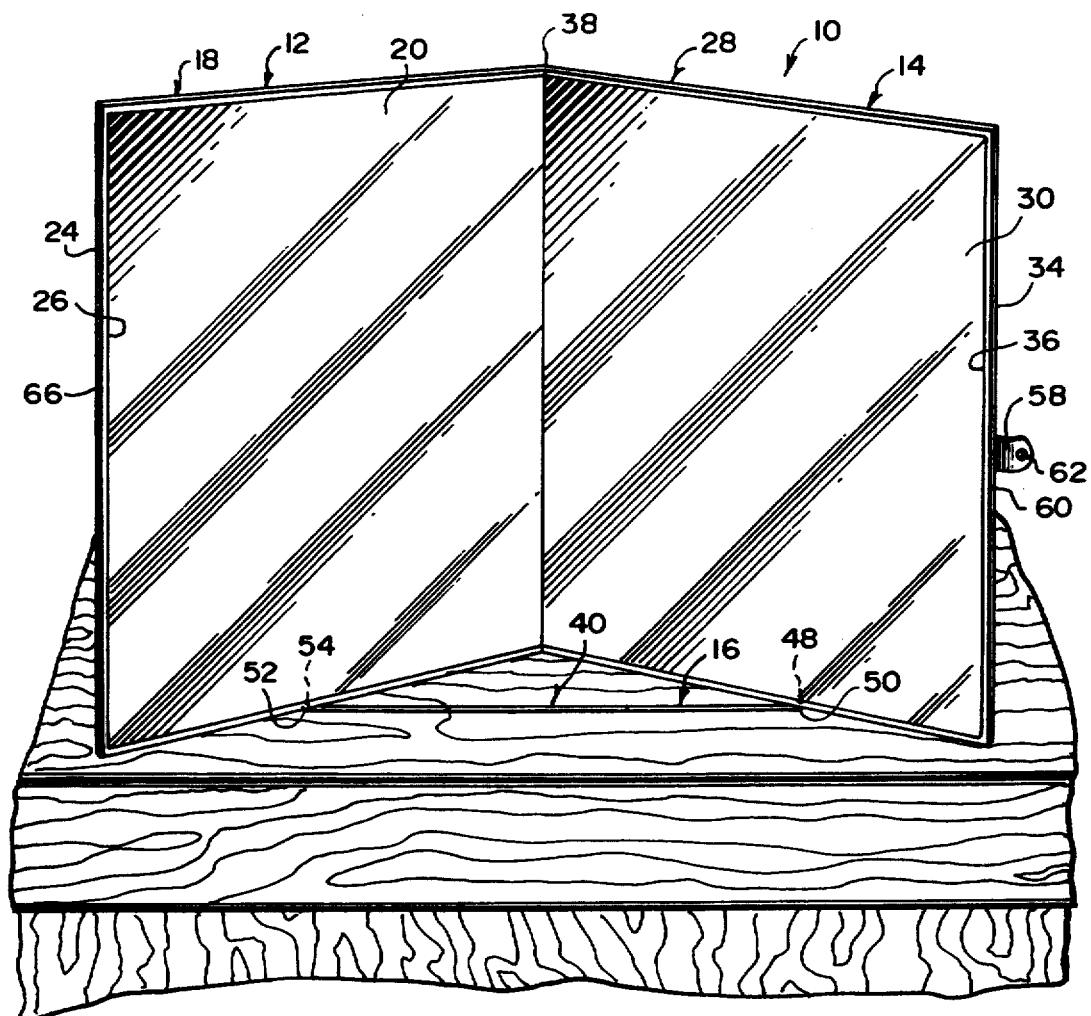
FIG. 5 is a front perspective view of the instant invention in use on a flat horizontal surface.
Figure 6:
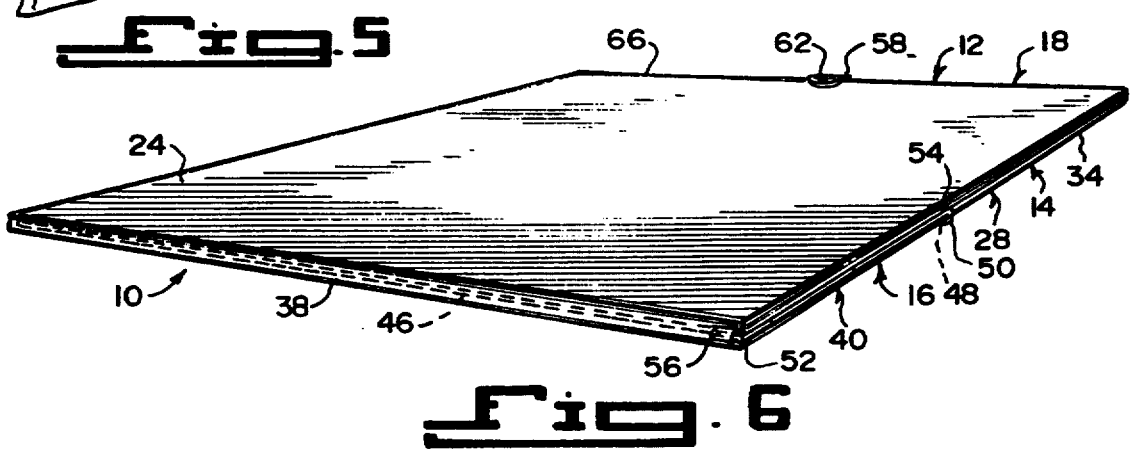
FIG. 6 is a rear perspective view of the instant invention in the closed position.

Turning now descriptively to the drawings, in which similar reference characters denote similar elements throughout the several views, FIGS. 1 through 6 illustrate a true image mirror 10, which consists of a first structure 12 for reflecting a virtual image of an object placed in front of it. A second structure 14 is for reflecting a virtual image of the object placed in front of it. A component 16 is for positioning the first reflecting structure at a right angle arrangement with the second reflecting structure. A true image will be reflected back, in which items on a right side will be seen on a right side and items on a left side will be seen on a left side, instead of being reversed as in a typical standard mirror.

The first reflecting structure 12 is a first mirror assembly 18. The first mirror assembly 18 includes a first transparent plate 20. A first thin metal coating 22 is applied onto a back surface of the first transparent plate 20 to reflect light. A first panel-shaped housing 24 having a recessed area 26 is to retain the first transparent plate 20 with the first thin metal coating 22 against the recessed area 26.

The second reflecting structure 14 is a second mirror assembly 28. The second mirror assembly 28 includes a second transparent plate 30. A second thin metal coating 32 is applied onto a back surface of the second transparent plate 30 to reflect light. A second panel-shaped housing 34 has a recessed area 36, to retain the second transparent plate 30 with the second thin metal coating 32 against the recessed area 36.

The positioning component 16 consists of a hinge 38 located between abutting side edges of the first panel-shaped housing 24 of the first mirror assembly 18 and the second panel-shaped housing 34 of the second mirror assembly 28. A telescopic support rod 40 extends between the bottom edges 42, 44 of the first panel-shaped housing 24 of the first mirror assembly 18 and the second panel-shaped housing 34 of the second mirror assembly 28. The telescopic support rod 40 is a of an adjusted length to keep the first mirror assembly 18 and the second mirror assembly 28 separated at the right angle arrangement.

The hinge 38 is a living fold type integral with the abutting side edges of the first panel-shaped housing 24 of the first mirror assembly 18 and the second panel-shaped housing 34 of the second mirror assembly 28. The hinge 38 includes an elongate shaft 46 therein, extending the full length of the hinge 38 to add extra strength thereto.

The telescopic support rod 40 is in a generally U-shaped configuration, having a pivot head 48 on a first arm 50 to engage with an exterior surface directly above the bottom edge 44 of the second panel-shaped housing 34. A second arm 52 of telescopic the support rod 40 can extend into an aperture 54 formed in the bottom edge 42 of the first panel-shaped housing 24. A clip member 56 is on the bottom of the hinge 38 to hold the second arm 52 of the telescopic support rod 40, when the true image mirror 10 is in a collapsed closed position.

A closure flap 58 is affixed to the exterior surface and extends over a free side edge 60 of the second panel-shaped housing 34. A snap fastener has a socket portion 62 in the closure flap 58 and a stud portion 64 on an exterior surface near a free side edge 66 of the first panel-shaped housing 24. When the true image mirror 10 is in the collapsed closed position, the socket portion 62 can engage with the stud portion 64 of the snap fastener, to keep the true image mirror 10 in the collapsed closed position when not in use.

OPERATION OF THE INVENTION

To use the true image mirror 10 a person simply disengages the socket portion 62 from the stud portion 64 of the snap fastener, to open the closure flap 58. The second side 52 of the support rod 40 is removed from the clip member 56. The first panel-shaped housing 24 is then pivoted away from the second panel-shaped housing 34. The second side 52 of the support rod 40 is then inserted into the aperture 54, to hold the first mirror assembly 18 away from the second mirror assembly 28 at the right angle of ninety degrees. The true image mirror 10 is placed upon a flat horizontal surface, so that the person can now look into the true image mirror 10.

LIST OF REFERENCE NUMBERS 10 true image mirror
12 first reflecting structure
14 second reflecting structure
16 positioning component
18 first mirror assembly for 12
20 first transparent plate
22 first thin metal coating on 20
24 first panel-shaped housing
26 recessed area in 24
28 second mirror assembly for 14
30 second transparent plate
32 second thin metal coating on 30
34 second panel-shaped housing
36 recessed area in 34
38 hinge
40 telescopic support rod
42 bottom edge of 24
44 bottom edge of 34
46 elongate shaft
48 pivot head
50 first arm of 40
52 second arm of 40
54 aperture in 42
56 clip member on 38
58 closure flap
60 free side edge of 34
62 socket portion of a snap fastener in 58
64 stud portion of the snap fastener on 24
66 free side edge of 24

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A true image mirror which comprises:
   a) a first means for reflecting a virtual image of an object placed in front of it, said first reflecting means being a first mirror assembly, wherein said first mirror assembly including a first transparent plate, a first thin metal coating applied onto a back surface of said first transparent plate to reflect light, and a first panel-shaped housing having a recessed area to retain said first transparent plate with said first thin metal coating against the recessed area;
   b) a second means for reflecting a virtual image of the object placed in front of it, said second reflecting means being a second mirror assembly, said second mirror assembly including a second transparent plate, a second thin metal coating applied onto a back surface of said second transparent plate to reflect light, and a second panel-shaped housing having a recessed area to retain said second transparent plate with said second thin metal coating against the recessed area; and
   c) means for positioning said first reflecting means at a right angle arrangement with said second reflecting means, so that a true image will be reflected back in which items on a right side will be seen on a right side and items on a left side will be seen on a left side, said positioning means including a hinge located between abutting side edges of said first panel-shaped housing of said first mirror assembly and said second panel-shaped housing of said second mirror assembly, and a telescopic support rod extending between the bottom edges of said first panel-shaped housing of said first mirror assembly and said second panel-shaped housing of said second mirror assembly and being of an adjusted length to keep said first mirror assembly and said second mirror assembly separated at the right angle arrangement.

2. A true image mirror as recited in claim 1, wherein said hinge is a living fold type integral with the abutting side edges of said first panel-shaped housing of said first mirror assembly and said second panel-shaped housing of said second mirror assembly.

3. A true image mirror as recited in claim 2, wherein said hinge includes an elongate shaft therein extending the full length of said hinge to add extra strength thereto.

4. A true image mirror as recited in claim 3, wherein said telescopic support rod is in a generally U-shaped configuration, having a pivot head on a first arm to engage with an exterior surface directly above the bottom edge of said second panel-shaped housing, while a second arm of said telescopic support rod can extend into an aperture formed in the bottom edge of said first panel-shaped housing.

5. A true image mirror as recited in claim 4, further including a clip member on the bottom of said hinge to hold the second arm of said telescopic support rod, when said true image mirror is in a collapsed closed position.

6. A true image mirror as recited in claim 5, further including:
   a) a closure flap affixed to the exterior surface and extending over a free side edge of said second panel-shaped housing; and
   b) a snap fastener having a socket portion in said closure flap and a stud portion on an exterior surface near a free side edge of said first panel-shaped housing, so that when said true image mirror is in the collapsed closed position, the socket portion can engage with the stud portion of said snap fastener, to keep said true image mirror in the collapsed closed position when not in use.

* * * * *